United States Patent
Rodriguez et al.

(10) Patent No.: US 7,505,763 B2
(45) Date of Patent: Mar. 17, 2009

(54) SYSTEM FOR REMOTELY OPERATING AND VIEWING A WIRELESS TELEPHONE DEVICE

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 11/101,617

(22) Filed: Apr. 7, 2005

(65) Prior Publication Data

US 2006/0229066 A1    Oct. 12, 2006

(51) Int. Cl.
*H04M 3/00* (2006.01)
(52) U.S. Cl. .................................... 455/420
(58) Field of Classification Search ............... 455/418, 455/419, 420; 709/208–211, 224–227
See application file for complete search history.

(56) References Cited

U.S. PATENT DOCUMENTS

| | | | |
|---|---|---|---|
| 5,956,636 A | 9/1999 | Lipsit et al. | |
| 6,014,561 A | 1/2000 | Molne | |
| 6,301,484 B1* | 10/2001 | Rogers et al. | 455/466 |
| 6,470,190 B2* | 10/2002 | Karhu | 455/550.1 |
| 6,496,692 B1 | 12/2002 | Shanahan | |
| 6,633,743 B1* | 10/2003 | Berlinsky | 455/11.1 |
| 6,650,894 B1* | 11/2003 | Berstis et al. | 455/420 |
| 7,043,263 B2* | 5/2006 | Kaplan et al. | 455/466 |
| 7,287,054 B2* | 10/2007 | Lee et al. | 709/204 |
| 2001/0019953 A1* | 9/2001 | Furukawa et al. | 455/420 |
| 2002/0049050 A1 | 4/2002 | Lelong-Gilbert | |
| 2003/0003907 A1* | 1/2003 | Lai et al. | 455/425 |
| 2003/0008646 A1 | 1/2003 | Shanahan | |
| 2003/0023700 A1 | 1/2003 | Swinton et al. | |
| 2003/0045278 A1* | 3/2003 | Kizu et al. | 455/419 |
| 2003/0114149 A1 | 6/2003 | Lehtonen et al. | |
| 2003/0129944 A1* | 7/2003 | Chang et al. | 455/41 |
| 2003/0134631 A1* | 7/2003 | Snyder et al. | 455/423 |
| 2003/0212684 A1 | 11/2003 | Meyer et al. | |
| 2004/0005880 A1 | 1/2004 | Shanahan | |
| 2004/0198335 A1* | 10/2004 | Campen | 455/419 |

OTHER PUBLICATIONS

3GPP2 "Short Messaging Service" 3rd Geneartion Partnership Project 2, www.3gpp2.org, no date usted.

* cited by examiner

*Primary Examiner*—Lester Kincaid
*Assistant Examiner*—Shantell Heiber
(74) *Attorney, Agent, or Firm*—Stephen J. Walder, Jr.; Diane R. Gerhardt

(57) ABSTRACT

A system is provided to enable a user of one wireless telephone device to remotely view or operate another wireless telephone device. The system includes a first wireless device that receives a remote control command from a second wireless device, wherein the remote control command requests authorization for the second wireless device to operate the first wireless device. If the first wireless device authorizes the second wireless device to operate the first wireless device, both enter a remote control mode, wherein operations entered on the second wireless device are transmitted to the first wireless device for operation by the first wireless device. Also, if the first wireless device authorizes the second wireless device to view the operations of first wireless device, both enter a remote viewing mode, wherein operations entered on the first wireless device are transmitted to the second wireless device for viewing by the second wireless device.

10 Claims, 12 Drawing Sheets

SYSTEM FOR REMOTELY OPERATING AND VIEWING A WIRELESS TELEPHONE DEVICE

TECHNICAL FIELD OF THE INVENTION

The present invention relates to wireless telephone devices in a calling network and, more particularly, to a method and apparatus for remotely operating and viewing a wireless telephone device by another wireless telephone device.

BACKGROUND

Developers are constantly incorporating more and more features and technology into wireless telecommunication systems. In fact, wireless based phones have advanced tremendously in recent years. For example, wireless phones use a variety of digital modulation techniques, such as Time Division Multiple Access (TDMA) and Code Division Multiple Access (CDMA). Regardless of modulation technique, wireless devices have a myriad of features, such as electronic phonebooks, speed dialing, single button voicemail access, and messaging capabilities. These are only a sample of features that are capable of, or have already been implemented into wireless devices. A particularly useful feature provides messaging capability between wireless devices. The Short Message Services (SMS) feature used in CDMA, for example, allows a user of one wireless device to transmit alphanumeric messages to another wireless device. To do so, a digital processing section within the mobile phone's hardware transmits, receives, and processes the SMS messages, which are typically alphanumeric display messages. However, as described in U.S. Pat. No. 6,301,484, service providers may also use SMS messages to remotely activate or update a mobile phone's software functions, such as voicemail, caller ID, and configuration settings. The general specification for SMS in CDMA can be found in Telecommunications Industry Association and Electronic Industries Association specification TIS/EIA/IS-637, SHORT MESSAGE SERVICES FOR WIDEBAND SPREAD SPETRUM CELLULAR SYSTEMS. The general specification for the CDMA phone system can be found in TIA/EIA/IS-95, MOBILE STATION-BASE STATION COMPATIBILITY STANDARD FOR DUAL-MODE WIDEBAND SPREAD SPECTRUM CELLULAR SYSTEM. However, the implementation of SMS is not limited to CDMA.

Needless to say, given their increasing power and complexity, operating modern wireless telephones can be confusing if not difficult, especially for new, non-computer savvy, or disabled users. Some users have difficulty operating their mobile phones, even turning them on. Thus, it would be advantageous for a caregiver, such as a parent or guardian, to be able to temporarily and remotely activate, operate, configure, and view operations on a dependent's wireless telephone, using the caregiver's wireless telephone, to assist the dependent. This would be particularly useful when the caregiver is attempting to call the dependent, but the dependent has inadvertently turned off his phone or is having trouble operating it. Accordingly, it would be advantageous to provide a system and method whereby a user of one wireless phone may control, operate, configure, and view the operations of a second wireless phone.

SUMMARY

Accordingly, an embodiment of the present invention provides a method, system, and program product whereby a user of one wireless telephone device can remotely view or operate another wireless telephone device. The method includes a first wireless device that receives a remote control message from a second wireless device or remote computer, wherein the remote control message requests authorization for the second wireless device to operate the first wireless device. In a second embodiment, a remote viewing message requests authorization for the second wireless device to view the operations of the first wireless device.

If the first wireless device authorizes the second wireless device to operate the first wireless device, both enter a remote control mode, wherein operations entered on the second wireless device are transmitted to the first wireless device for operation by the first wireless device. Similarly, if the first wireless device authorizes the second wireless device to view the first wireless device, both enter a remote viewing mode, wherein operations entered on the first wireless device are transmitted to the second wireless device for viewing by the second wireless device.

BRIEF DESCRIPTION OF THE DRAWINGS

The novel features believed characteristic of the invention are set forth in the appended claims. However, the present invention will be better understood and its numerous objects and advantages will become more apparent to those skilled in the art by reference to the following drawings, in conjunction with the accompanying specification, in which:

DETAILED DESCRIPTION

Figure 1:
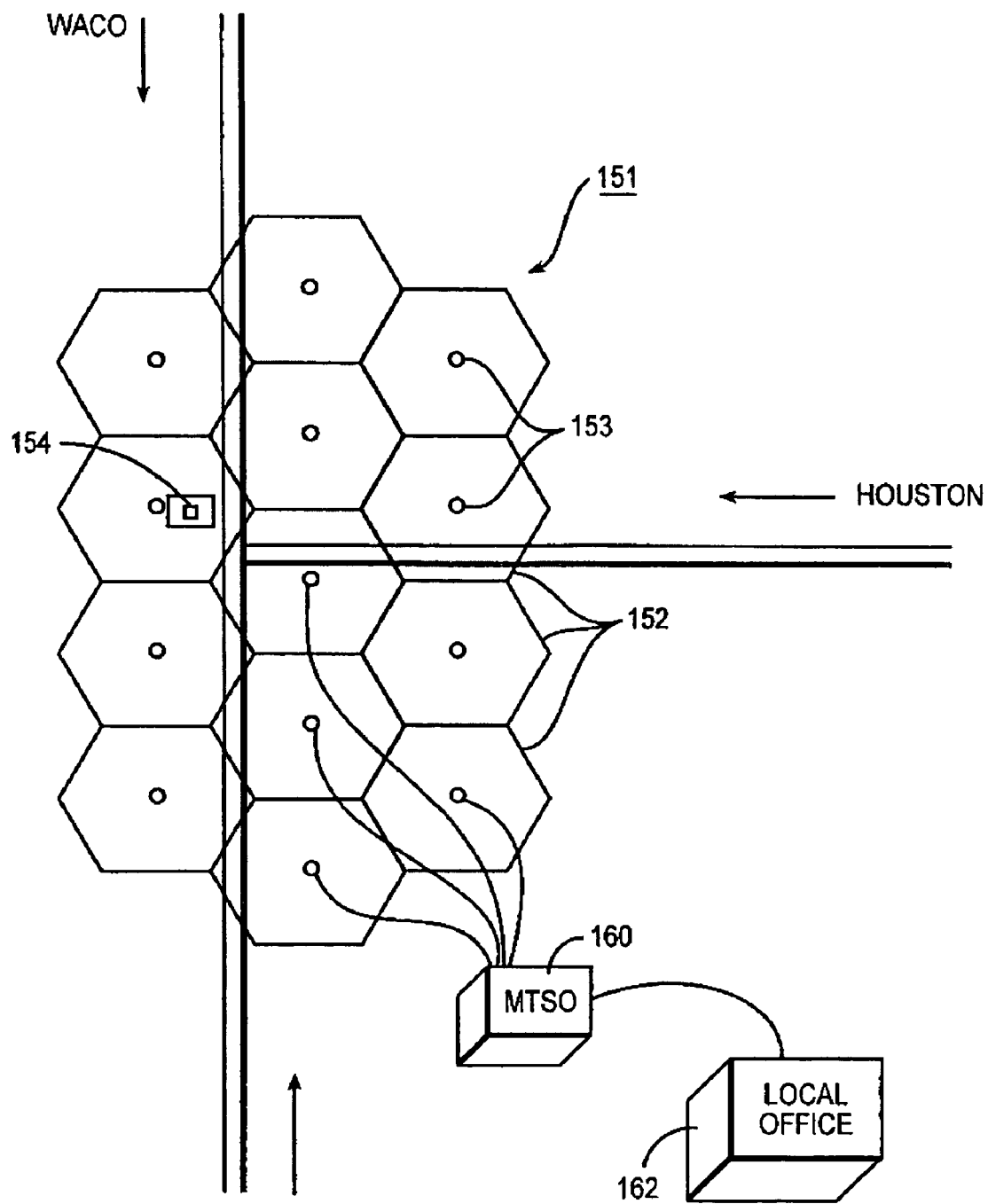
FIG. 1 is an illustrative conventional wireless cellular telecommunications network.

FIG. 1 provides some background information on conventional cellular technology to be used in accordance with an embodiment of the present invention. Illustrative cellular telecommunication system 151 shows multiple cells 152 and base stations 153 that a mobile telephone customer may encounter while traveling. Each cell 152 typically ranges in diameter from 2 to 10 miles. Each also has a base station 153 that includes one or more antenna towers and a radio transceiver (not shown). Each carrier in each city or region also operates a central office called the Mobile Telephone Switching Office (MTSO) 160. This office handles all phone connections to other mobiles and to the normal land-based phone system (local office 162) and controls all of the base stations in the region. For example, MTSO 160 gathers traffic from dozens of cells 152 and passes it on to local office 162. MTSO 160 also places calls to and from land based telephones to wireless customers, switches calls between cells 152 as mobile users travel across cell boundaries, and authenticates wireless customers before they make calls. For more information on conventional cellular layout and technology, see *Cellular Telephone Basics: AMPS and Beyond*, by Tom Farley with Mark van der Hoek, which is incorporated by reference herein.

Mobile phones communicate with each other using base stations 153 on dedicated paired frequencies called channels, which are typically in the 800 MHz range and assigned by MTSO 160. Each call uses two channels, one for voice and one for control. There are four frequency paths: "forward control path" from base station to mobile for control, "reverse control path" from mobile to base station for control, "forward voice path" from base station to mobile for voice, and "reverse voice path" from mobile to base station for voice. Base stations 153 may use SMS messages to transmit identifying information or overhead on their respective forward control paths. Similarly, mobile phones may use SMS messages to communicate with each other and base stations 153 using their respective reverse control paths. Each formats the SMS messages as Data Burst Messages (defined in TIA/EIA/IS-95), which may be directed to individual wireless devices as point-to-point messages or to many units as broadcast messages.

Figure 2:
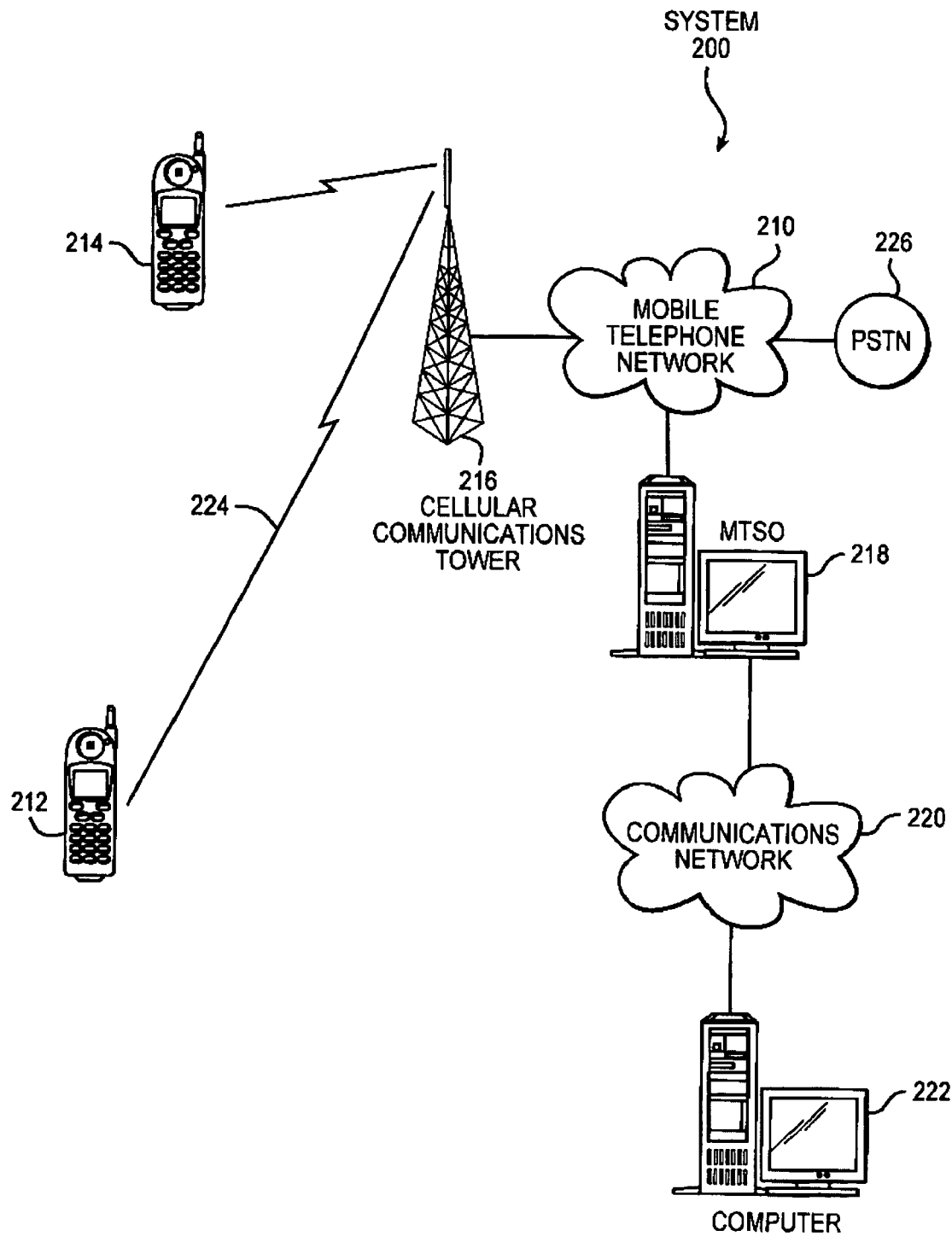
FIG. 2 is a pictorial representation of a wireless cellular telecommunications system that may be used in an embodiment of the present invention.

FIG. 2 is a pictorial representation of a wireless cellular telecommunications system 200 in which the illustrative embodiment may be practiced. However, one skilled in the art will readily recognize that other wireless configurations and networks, such as a mobile satellite network, may be implemented without departing from the scope and spirit of the invention. System 200 includes mobile telephone network 210 and communications network 220 for providing communication links between various devices and computers connected in system 200. Both may include various connection types such as, for example, wire, wireless, or fiber optic cable communication links. Further, system 200 may include: two or more wireless devices 212 and 214 (also referred to as "mobiles", "mobile phones", "wireless telephones", and other commonly used terms), each having a basic display and user input mechanisms (see FIG. 3 for more detail); at least one cellular base station communications tower 216 (a "base station" includes a tower and a transceiver located at the center of a cell, whose primary purpose is to handle all incoming and outgoing calls within the cell); one or more mobile telephone switching offices (MTSOs) 218, which communicate with base station communication towers in a city or region for a particular carrier and further control connections to a conventional land-based public switched telephone network (PSTN) 226 via mobile telephone network 210; and, optionally, one or more conventional computers 222 having a processor, memory, and database storage (see FIG. 12). In the depicted example, mobile telephone network 210 connects MTSO 218 with tower 216, which in turn communicates with various wireless devices, such as wireless devices 212 and 214.

Additionally, system 200 may include other servers, clients, and devices not shown. For example, other computers may communicate with communications network 220. In the depicted example, system 200 may be implemented within the Internet with communications network 220 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, system 200 may also be implemented using a number of different types of networks, such as for example, an intranet, a local area network, or a wide area network. FIG. 2 is intended as an example and not as an architectural limitation for the present invention.

Figure 3A:
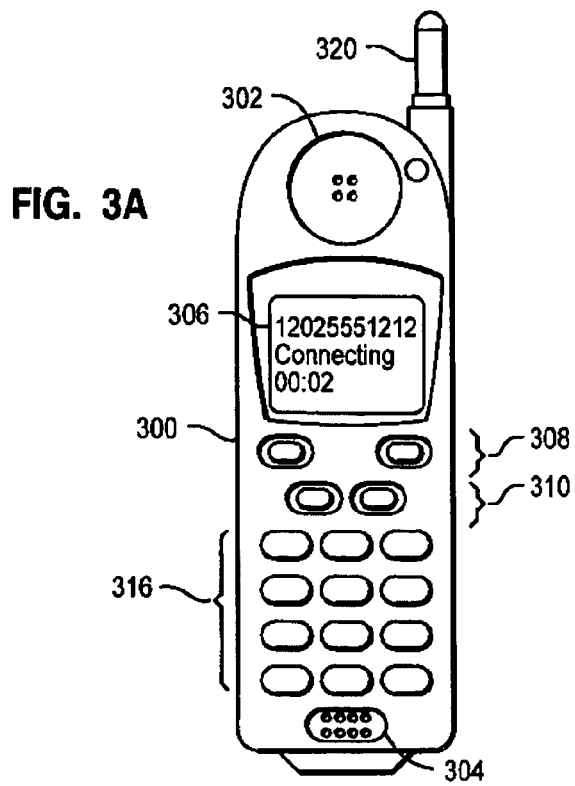
FIGS. 3A and 3B illustrate a wireless telephone device that may be used in an embodiment of the present invention.
Figure 3B:
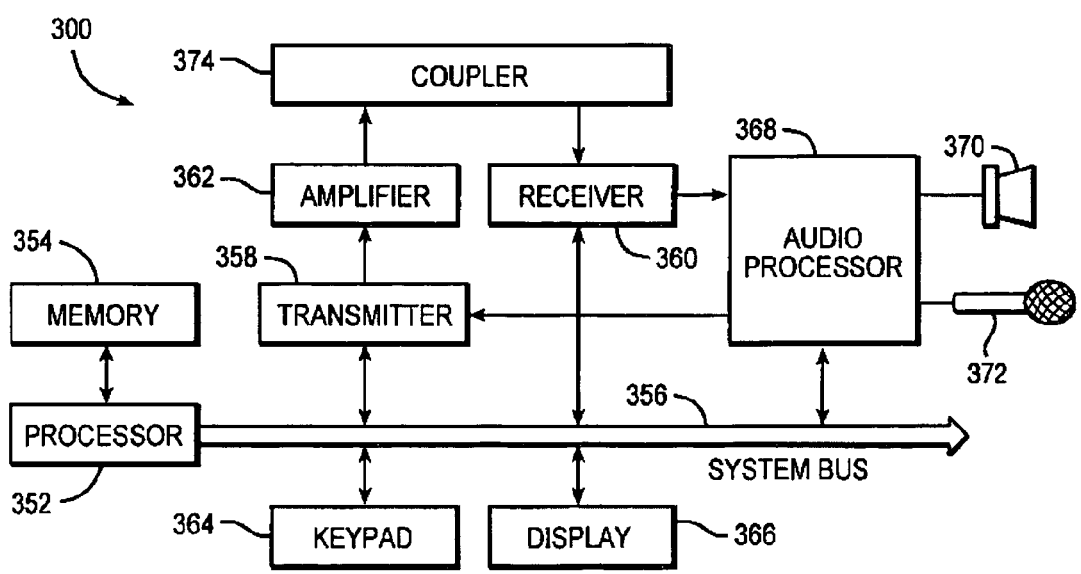

FIGS. 3A and 3B illustrate a wireless device that may be used as the "controlling", "controlled", "viewing" or "viewed" devices in embodiments according to the present invention. FIG. 3A shows wireless device 300 having speaker 302, microphone 304, display 306, and keypad 316, which allows the user to dial numbers or letters. Wireless device 300 also includes antenna 320 for communication with the nearest base station. Wireless device 300 may include other components common to conventional mobile telephones, such as: function buttons 308, which allow the user to change telephone settings and perform and/or select different functions (e.g., retrieval of messages, view a call log, view or change telephone book); scroll buttons (not shown), which allow the user to scroll through a displayed list or menu; and call and receive buttons 310, which allow the user to place and receive calls. Moreover, other wireless devices may be used that can dial into the cellular telecommunications system 200 and transmit/receive SMS-type messages, such as some personal digital assistants (PDAs) and notebook computers.

FIG. 3B is a block diagram of an internal hardware configuration of wireless device 300. Specifically, wireless device 300 includes processor 352, which is a general-purpose microprocessor operating under the control of program instructions stored in memory 354. Those instructions program processor 352 to control or view the operation of another wireless device (or vice versa), as described in more detail herein. System bus 356 connects processor 352 to transmitter 358, receiver 360, keypad 364, display 366, and audio processor 368. Keypad 364 may be keypad 316 in FIG. 3A, and display 366 may be display 306, which may be liquid crystal or other known displays such as active matrix. Coupler 374 couples signals from transmitter 358 and receiver 360 to/from a telephone signal to provide full duplex communication. An antenna provides the telephone signal, such as antenna 320 in FIG. 3A. Audio processing circuit 368 provides basic analog audio outputs to speaker 370 (which corresponds to speaker 302 in FIG. 3A) and accepts analog audio inputs from microphone 372 (which corresponds to microphone 304 in FIG. 3A). Receiver 360 demodulates and decodes signals received from coupler 374. Transmitter 358 codes and modulates signals passed to it by processor 352, audio processor 368, keypad 364, and display 366. Power amplifier 362 amplifies the output of transmitter 358 to control the power level at which wireless device 300 transmits signals.

Figure 4:
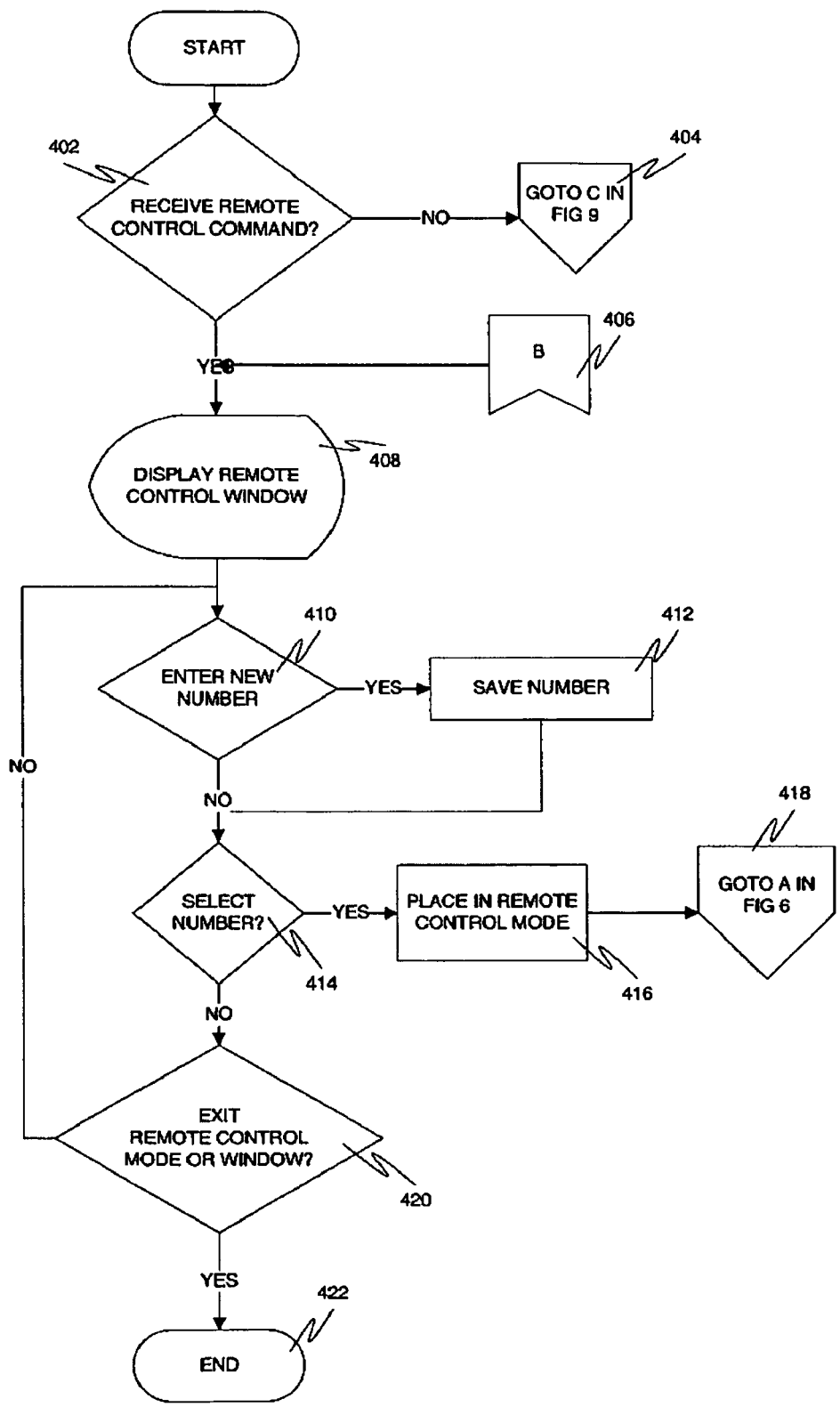
FIG. 4 is a flowchart illustrating the operation and steps performed by a controlling wireless telephone device in accordance with an embodiment of the present invention.
Figure 5:
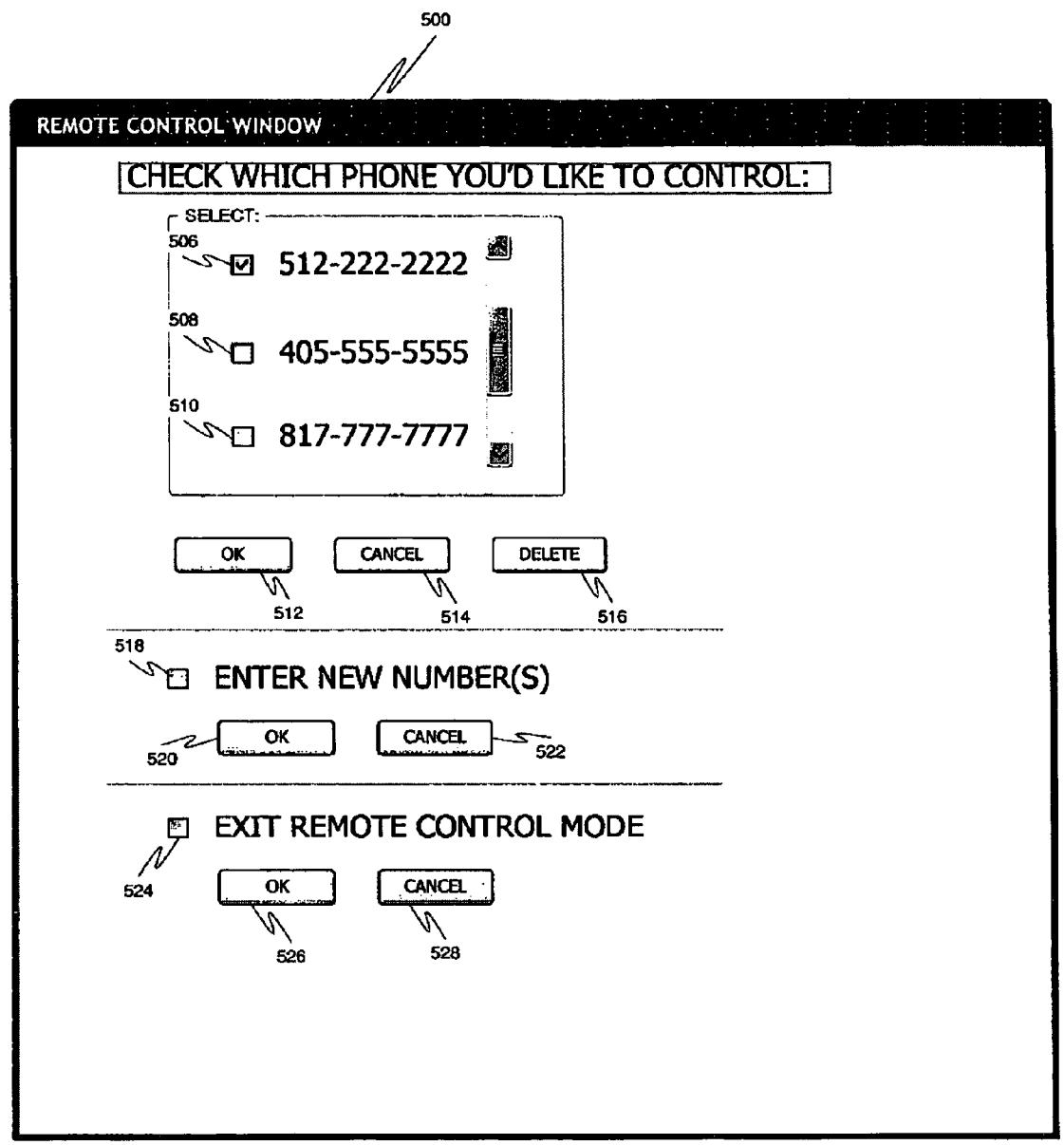
FIG. 5 is a pictorial representation of a remote control window in accordance with an embodiment of the present invention.

FIG. 4 is a flowchart illustrating the initial operation and programmed steps performed by a "controlling" wireless device in accordance with an embodiment of the present invention. The controlling wireless device, or simply controlling device, controls or attempts to control the operation of another wireless device (which, in turn, is referred to as the "controlled" device). Referring to FIGS. 3, 4, and 5, processing begins at 402, where the controlling device (e.g., wireless device 214 in FIG. 2) is programmed to determine if it has received a remote control command from its user, wherein the remote control command initiates the process of remotely controlling another wireless device. A user may invoke this remote control command when, for example, he presses right function button 308 on the controlling device (see FIG. 3A). Alternatively, any other suitable combination of user input buttons might be used to invoke the command. If the controlling device does not receive the remote control command, control moves to step C in FIG. 9, where the controlling device determines if it has received a remote viewing command (described herein). Returning to 402, if the controlling device received the remote control command from its user, at 408, the controlling device displays a remote control window (see Remote Control Window 500 in FIG. 5) on its display 306. Remote Control Window 500 allows the controlling device's user to input and/or select one of a plurality of wireless devices to operate, each identified by its telephone number in menu 504 (e.g., wireless device 506, 508, or 510). Moreover, in an alternative embodiment, a user of computer 222 (see FIG. 2) may invoke the remote control command in substitution for the controlling device by making a selection on Remote Control Window 500, which computer 222 displays on display 1238 (see FIG. 12, described herein). In turn, computer 222 sends a remote control message (described herein) to the selected wireless device via communications network 220, MTSO 218, mobile telephone network 210, and tower 216 using SMS messaging. Thus, computer 222 makes a remote control request for the controlling device.

At 410, the controlling device determines if its user would like to enter another telephone number into its graphical user interface (GUI). The user does this by checking box 518 and OK box 520 using the controlling device's scroll buttons (not shown). However, one skilled in the art readily recognizes that user selections and input may be made using one or more of keypad buttons 316, function buttons 308, call and receive buttons 310, and scroll buttons (not shown). If checked, the user enters the telephone number using keypad 316 into a displayed menu (not shown), wherein processor 352 saves the number in memory 354 and adds it to menu 504 at 412. At 414, the controlling device determines if its user has selected a displayed telephone number in menu 504. The user does this by checking box 506, 508, or 510, for example. Then, the user may attempt to remotely operate the wireless device associated with the selected number by selecting OK box 512, cancel his selection by selecting "cancel" 514, or delete the number by selecting "delete" 516. If the user selects a telephone number and OK box 512, at 416, the controlling device enters a "remote control mode" and, at 418, processing moves to A in FIG. 6 (described herein). In one embodiment, upon entering the remote control mode, the controlling device's processor 352 sets a "lock out" bit in its memory 354 such that all new attempted local operations, except for the remote control command, entered by its user through keypad 316 or other buttons are programmably locked out for local operation until the controlling device exits the remote control mode. Otherwise, if the user did not select a number, at 420, the controlling device determines if its user would like to exit the remote control mode (or, if not currently in the remote control mode, exit window 500). The user does this by checking box 524 and then OK box 526 and, if so, the process terminates at 422. Cancel button 528 allows the user to back out of the exit operation and return to 410.

Figure 6:
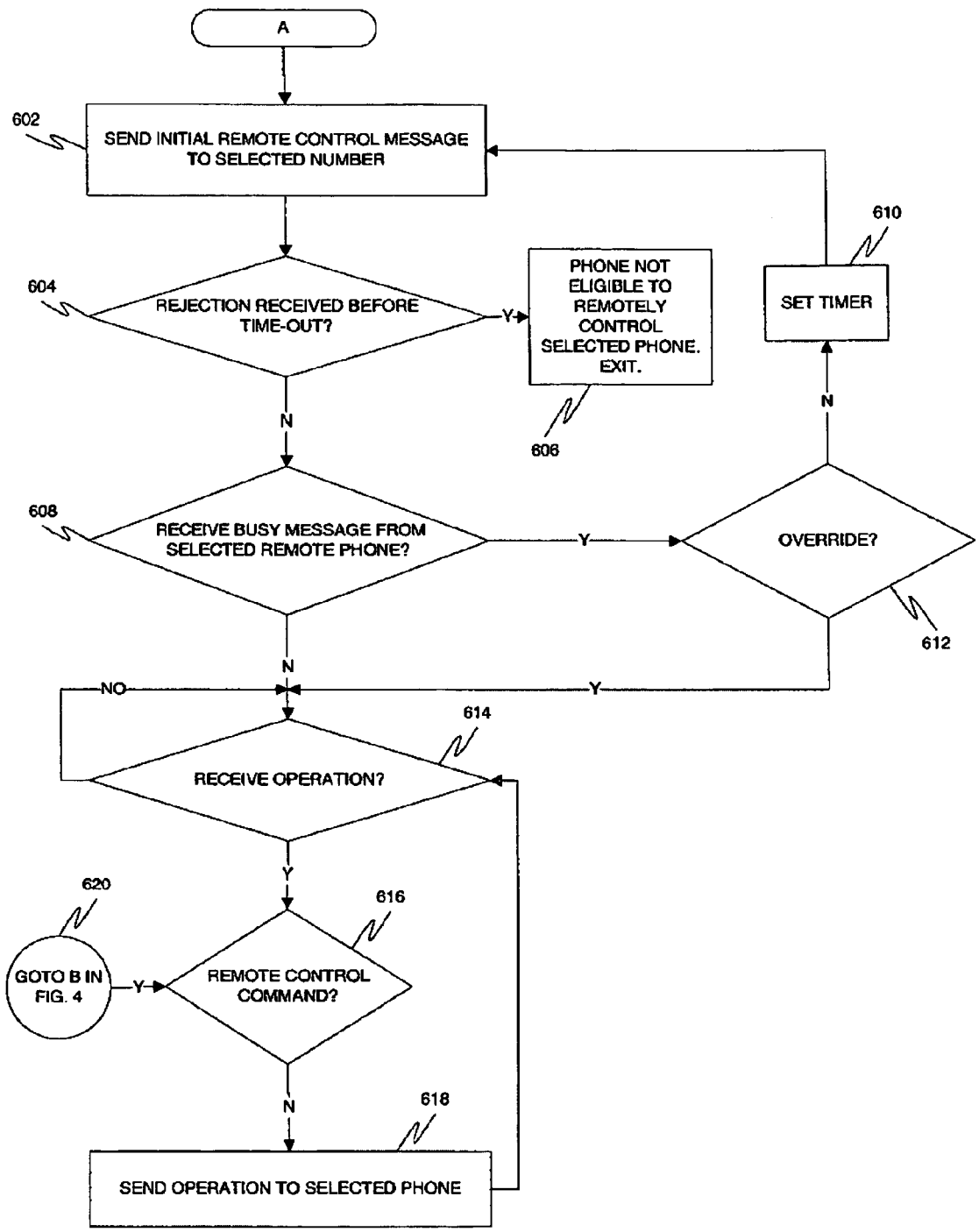
FIG. 6 is a flowchart illustrating the operation of the controlling wireless telephone device after it has received a remote control command from a user.

FIG. 6 is a flowchart illustrating the programmed operation of the controlling device (e.g., wireless device 214) after it has received a remote control command from its user. Referring to FIGS. 3A, 3B and 6, processing begins at 602, where processor 352 of the controlling device constructs, according to programmed instructions in memory 354, an initial SMS remote control message to be transmitted on its reverse control path via transmitter 358, amplifier 362, coupler 374, and antenna 320 to the selected wireless device (herein "controlled device", which may be wireless device 212) using, for example, wireless cellular telecommunications system 200. One function of the initial SMS remote control message is to request authorization from the controlled device to remotely operate and activate it. The first characters of the SMS remote control message are a predetermined start delimiter, defined as a series of characters that normally do not occur at the start of a message. For example, the start delimiter may be $$ZG, but the number and sequence of characters are not limited and should be chosen to minimize false indications of SMS remote control messages. A predetermined delimiter, such as a "$", denotes the end of the current field and the beginning of the next. The next data field may identify the model ID number of the intended controlling device, which will be compared with a list of acceptable model ID numbers stored in the controlled device's memory 354 to determine if the devices are compatible. For example, it is possible that some older versions of phones may not be able to control newer versions. Nevertheless, the controlled device can compare the intended controlling device's model ID number with acceptable model ID numbers stored in its memory to make that determination. The next data field identifies the sender's telephone number, followed by the next field, which may identify a minimum software version required to perform the process. Finally, the next field may include a predetermined code that may be processed by the controlled device to perform certain features or functions (described in further detail herein). Accordingly, an illustrative initial SMS remote control message may be:

$$ZG$200A?4044441234$303$1000$$

where $$ZG indicates a remote control message, 200A indicates the model ID number of the intended controlling device, 4044441234 is the telephone number of the controlling device, 303 indicates the minimum software version, 1000 indicates a function to be performed, such as activate the controlled device, and $$ indicates the end of the SMS remote control message.

After the controlling device transmits the initial SMS remote control message on its reverse control path to the controlled device, at 604, the controlling device determines if it has received an SMS rejection message on its forward control path at receiver 360 from the controlled device (via cellular telecommunications system 200) before a predetermined amount of time has elapsed. The controlling device identifies a message as being a rejection message by noting the presence of a predetermined delimiter, followed by a telephone number of the controlled device. For example, the rejection message may be $$56$5121234567$$, where $$56 indicates a rejection, $ is the separation delimiter between the data fields, 5121234567 is the telephone number of the controlled device, and the final $$ indicates the end of the last data field. The controlling device's processor 352 parses the message according to the field delimiters within the message. If the controlling device receives a rejection message, at 606, the controlling device terminates the remote control process because it does not have authorization from the controlled device to remotely operate it. This may be because, for example, the controlled device does not have suitable software to support remote control, the handsets are incompatible, and/or the controlling device simply does not have permission. If the controlling device does not receive a rejection message, at 608, in one embodiment, the controlling device determines if it has received a busy message from the controlled device. For example, the busy message may be $$23$5121234567$$, where $$23 indicates the controlled device is busy, $ is the separation delimiter between the data fields, 5121234567 indicates the telephone number of the controlled device, and the final $$ indicates the end of the last data field. If the controlled device is busy, at 612, the controlling device determines if its user wants to override the conversation of the controlled device. The controlling device's user does so by selecting an override box in a menu (not shown) displayed by the controlling device on display 306 in response to receiving the busy message. If selected, control moves to 614, where the controlling device waits for its user to enter operations on its keypad 316 and other buttons to be sent to the controlled device (in turn, the controlled device will override and terminate its local conversation if it receives an operation from the controlling device). If not selected, at 610, the controlling device's processor 352 sets a timer and control returns to 602 after expiration of the timer, where it sends another initial SMS remote control message to the selected "controlled" device.

Returning to 614, the controlling device is in the remote control mode (see step 416 in FIG. 4), now has control of the controlled device, and waits for an operation from its user via keypad 316 and function buttons 308. As previously described, upon entering the remote control mode, the controlling device's processor sets a "lock out" bit in its memory 354 such that all new local operations, except for the remote control command, entered through its keypad 316 or other buttons are programmably locked out for local operation until the controlling device exits the remote control mode. Similarly, the controlled device is also in the remote control mode (described herein) and waits to receive operations, in the form of SMS remote control messages, while all local operations entered through its keypad 316 and other buttons are programmably locked out. If an operation is received, at 616, the controlling device determines if the operation is a remote control command (see step 402 in FIG. 4 above) from its user and, if so, control moves to B in FIG. 4 at 620. For example, if the user of the controlling device desires to exit the remote control mode, he inputs the remote control command using a pre-determined combination of keypad 316 and/or function buttons 308. Otherwise, if the received operation is not a remote control command, at 618, the controlling phone sends the operation to the controlled device via an SMS remote control message on antenna 320 to be processed by the controlled phone. Control returns to 614, where the controlling device waits for another operation from its user via keypad 316 and function buttons 308. Thus, the controlling device functions, in essence, as if it were the other phone. For example, if a user dials a number on the controlling device, the controlling device transmits that number via an SMS remote control message to the controlled device, whereupon the controlled device dials it. In an optional embodiment, the user of the controlling device may selectively toggle between operating the controlled device and the controlling device using a menu selection (not shown).

Figure 7:
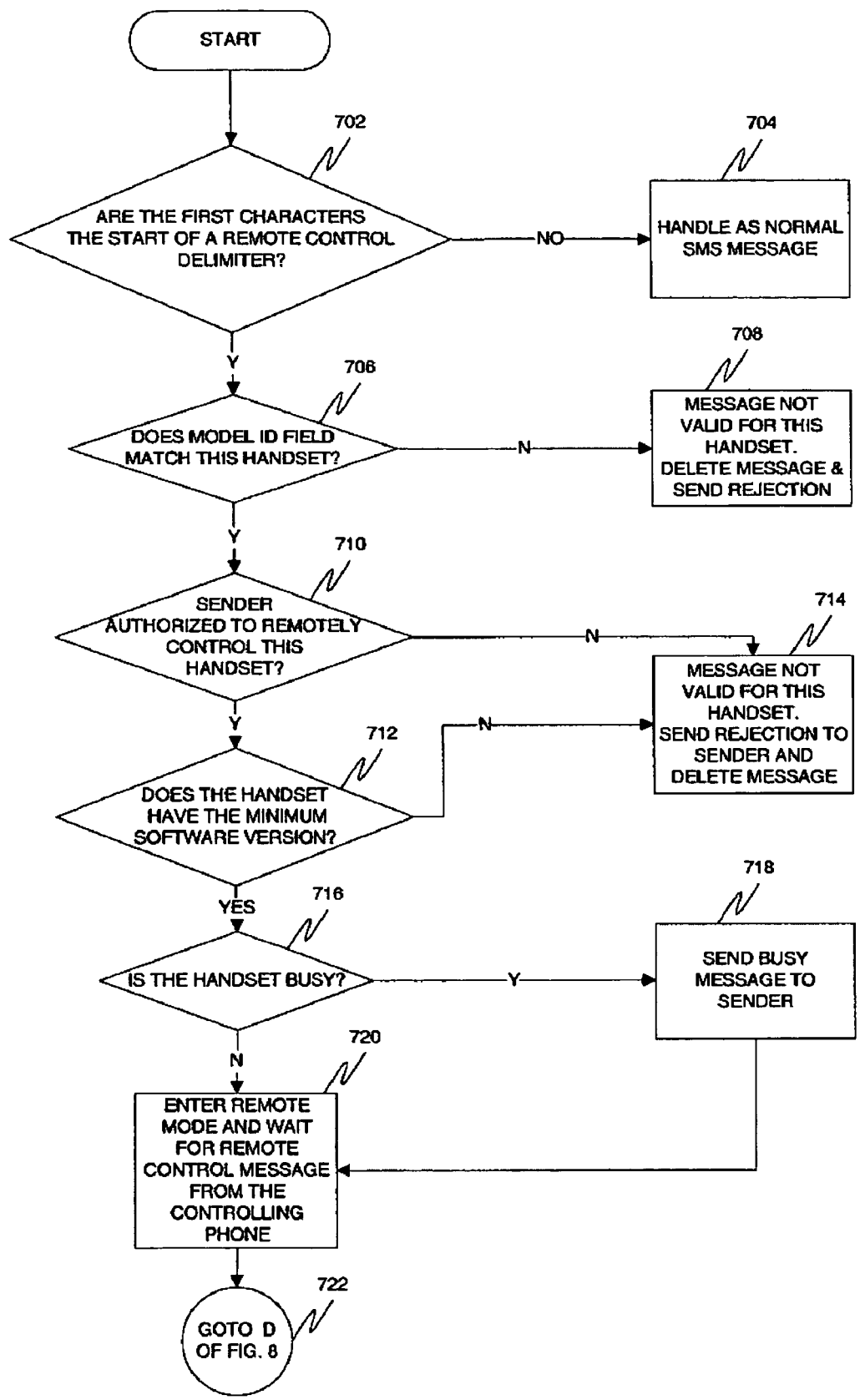
FIG. 7 is a flowchart illustrating the operation of the controlled wireless device after it has received a remote control message in accordance with an embodiment of the invention.

FIG. 7 is a flowchart illustrating operation of the controlled device (e.g., wireless device 212) in accordance with an embodiment of the invention. At 702, the processor 352 of the controlled device is programmed to monitor its forward control path to determine if receiver 360 has received an initial SMS remote control message, which will contain a start delimiter (e.g., $$ZG). If a received SMS message does not contain the start delimiter, at 704, the controlled device processes the SMS message as a conventional SMS message. If a received SMS message does contain the start delimiter, at 706, the processor 352 of the controlled device parses the initial SMS remote control message and examines the next field to determine if the retrieved model ID matches its own. If no match, the hardware of the controlled device (i.e., handset) may not be compatible with the controlling device. To make that determination, the controlled device's processor 352 scans a database list (not shown) of compatible model ID numbers (stored in memory 354) for the received model ID. If not found, at 708, the controlled device's processor 352 deletes the message based on non-compatibility between the handsets and sends a rejection message to the controlling device. However, if there is compatibility, at 710, the controlled device's processor 352 examines the next field of the remote control message, which is the telephone number of the controlling device, to determine if the controlled device has authorized the controlling device to remotely control it. To make that determination, the controlled device's processor 352 scans a standard database authorization list (not shown) in memory 354 for the controlling device's telephone number. If not found, at 714, the controlled device may determine that the controlling device is not authorized, send a rejection to the sender, and delete the message. However, if not found, in an alternative embodiment, the user of the controlled device may selectively authorize the controlling device to control the controlled device by selecting an "OK to Authorize" box (not shown) displayed in a display window on the controlled device. If selected, the controlled device adds the controlling device's telephone number to the database authorization list and control moves to 712. Returning to 710, if the controlled device locates the controlling device's telephone number in the database authorization list, at 712, the controlled device examines the next field (software version) to determine if it has at least the minimum software version required to perform the process. To make that determination, the controlled device's processor 352 scans a software version list (not shown) of compatible software versions (stored in memory 354) for the received software version. If not found, at 714, the controlled device determines that the message is not valid, sends a rejection message to the sender, and deletes the message. If found, at 716, in one optional embodiment, the controlled device determines if it is busy (i.e., its user is engaged in a local conversation). If not busy, control moves to 720. If busy, at 718, in one optional embodiment, the controlled device sends a busy message to the controlling device and control moves to 720. The controlled device's processor 352 determines if it is busy by checking a "busy" bit in memory 354, which the controlled device sets during the time it uses transmitter 358. In turn, upon receipt of the busy message, the controlling device may choose to override the busy state of the controlled device (see 612 in FIG. 6). Returning to 720, whether busy or not, the controlled device enters the remote control mode, wherein it processes the last field of the initial SMS remote control message, waits for a remote operation (i.e., SMS remote control message) from the controlling device and, upon receipt, terminates any existing local operation. The last field of the initial SMS remote control message (e.g., code 1000) instructs the controlled device to: i) turn on (if it was turned off) by setting an "on" bit in memory 354, resulting in power being applied to all components; ii) set a "lock out" bit in memory 354 so that any new local operations entered through its keypad 364 and other buttons are locked out (however, an existing "busy" operation may continue until it receives SMS remote control messages from the controlling device); and iii) optionally send a SMS confirmation message to the controlling device. Again, for purposes of remote control processing, the controlled device monitors its forward control path for commands/messages (also referred to as operations), from the controlling device, which will be in the form of SMS remote control messages. As noted, if the controlled device is busy with a local operation when it receives an SMS remote control message from the controlling device, it terminates the local operation (e.g., telephone call) and processes the received message. At 722, processing continues at D of FIG. 8.

Figure 8:
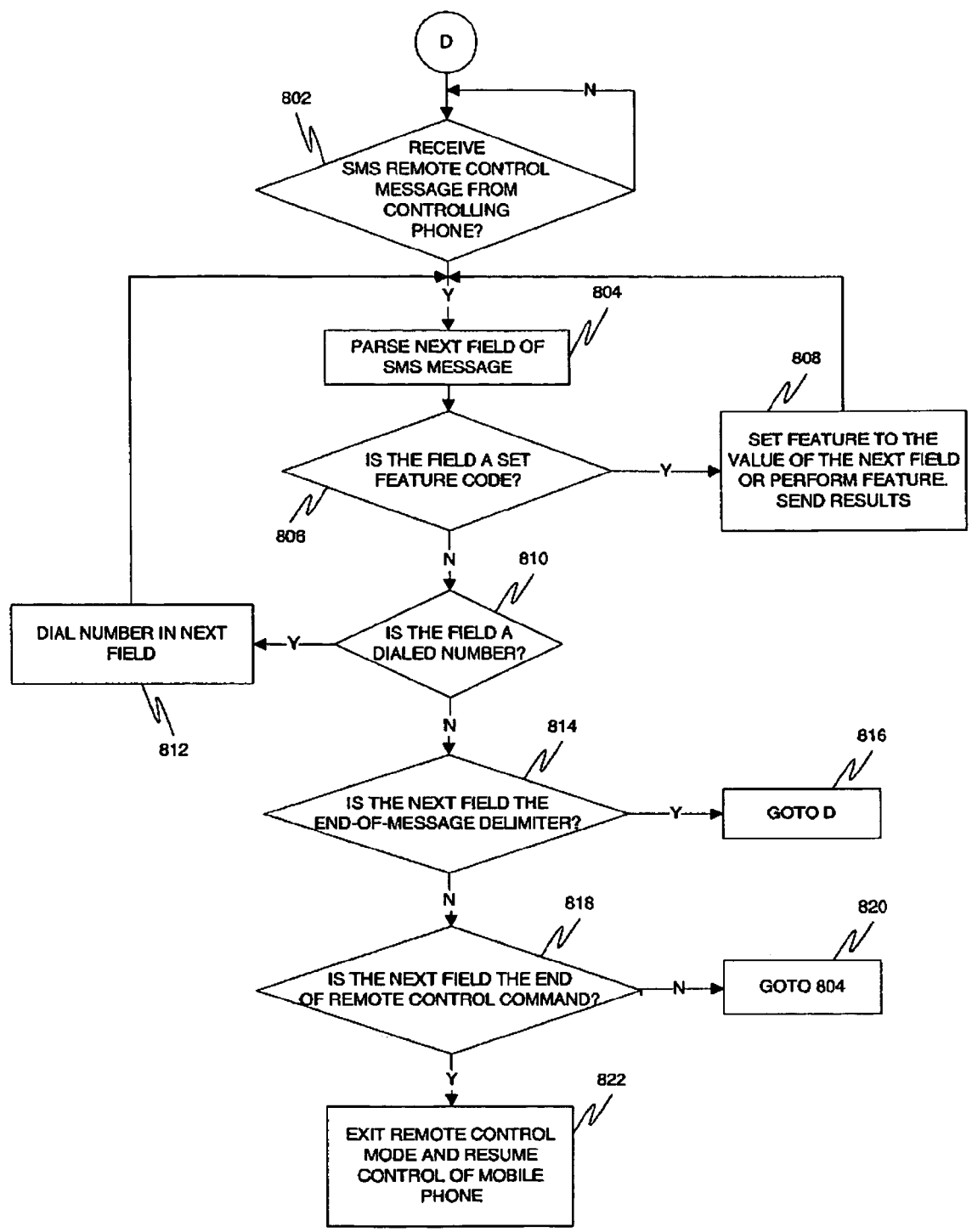
FIG. 8 is a follow-on flowchart to FIG. 7 illustrating the operation of the controlled wireless device after it has entered the remote control mode in accordance with an embodiment of the invention.

FIG. 8 is a follow-on flowchart to FIG. 7 illustrating the programmed operation of the controlled device after it has entered the remote control mode in accordance with an embodiment of the invention. At 802, the controlled device determines if it has received on its forward control path an SMS remote control message, which it will recognize if the first and second fields of a message are the start delimiter ($$ZG) and sender's telephone number, respectively. An optional encrypted security code or password may be added in a third field for security. If not, control returns to 802. If so, at 804, the controlled device parses the next field of the message. At 806, the controlled device determines if the next field is one of numerous set feature codes, which are used to change, select, or view standard mobile telephone features such as one touch dialing, telephone book entries, message retrieval and playback, and call log. As an example, when the user of the controlling device selects the "Menu" button on his phone (e.g., by pressing the left function button 308), the controlling device transmits, on its reverse control path via antenna 320, an SMS remote control message containing set feature code 100 to the controlled device. In response, at 808, the controlled device looks up code 100 in a database table (see Table 1 below) in its memory 354, determines that it corresponds to the Menu feature, displays on its display 306 the results of selecting Menu (e.g., display "Messages"), and transmits those results (e.g., "Messages") on its reverse control path via antenna 320 using an SMS remote control message (e.g., $$ZG$5125551234$100$Messages$$, where 5125551234 is the telephone number of the controlled device) to the controlling device. In turn, the controlling device recognizes that message as an SMS remote control message from parsing the first two fields, recognizes code 100 as the Menu function, and then displays the results of the Menu function (e.g., Messages) on its display 306. Similarly, if the user of the controlling device selects "Messages" on his phone (e.g., by again pressing left function button 308), the controlling device transmits an SMS remote control message containing set feature code 110 to the controlled device. In response, at 808, the controlled device looks up code 110 in Table 1, determines that it corresponds to the Messages feature, displays on its display 306 the results of selecting "Messages" (e.g., display "Write messages"), and transmits those results to the controlling device, which will also display them on its display 306. If the user of the controlling device selects "Add Entry" on his phone by pressing right function button 308 and then enters "Jane Doe" using keypad 316, the controlling device transmits an SMS remote control message containing set feature code 120 in one field, followed by the name of the entry in the next field, to the controlled device. In response, the controlled device recognizes code 120 as an "Add Entry" feature by examining Table 1 and sets the name of the new entry to the value in the next field (e.g., Jane Doe). In this case, there are no results to send back to the controlling device. Returning to 806, if the next field of the SMS message is not a set feature code, the controlled device determines if it is a dialed number. As an example, if the user of the controlling device dials a number and selects call button 310, the controlling device transmits an SMS remote control message containing code 130 in one field, followed by the dialed number in the next field, to the controlled device. In response, at 810, the controlled device recognizes code 130 as a "dial number" function by examining Table 1, dials the number at 812 in the number field (e.g., 5124441234), and control returns to 804. One skilled in the art will readily recognize that the controlling device can receive numerous functions and features (collectively referred to as operations) from its user, associate a code with each of those operations, and transmit those codes to the controlled device to be performed by the controlled device. If the next field of the SMS remote control message is not a dialed number, at 814, the controlled device determines if the next field is an end-of-message delimiter (e.g., $$) and, if so, at 816, waits for a new SMS remote control message from the controlling device and control returns to D. If not an end-of-message delimiter, at 818, the controlled device determines if the next field is an end-of-remote control delimiter (e.g., $$$). If so, at 822, the controlled device exits the remote control mode and resumes local control of the mobile phone handset. If not, at 820, control returns to 804, where the controlled device parses the next field. Using this process, the controlling device operates the controlled device.

TABLE 1

REMOTE CONTROL MODE

| Code | Function/Operation | Next Field |
|---|---|---|
| 100 | "Menu" Function; Display "Messages"; Send results | N/A |
| 110 | "Messages" Function; Display "Write messages", Send Results | N/A |
| 120 | "Add Entry" Function; Set entry to next field | Jane Doe |
| 130 | "Dial Number" Function; Dial number in next field | 5124441234 |
| 1000 | Turn on mobile phone; set "on" bit to 1; set "lock out" bit to 1; | N/A |
| $$ZG | Indicates Remote Control Message | N/A |
| $$56 | Indicates a Rejection Message | N/A |
| $$23 | Indicates a Busy Message | N/A |
| $$76 | Indicates a Confirmation Message | N/A |
| $$ | Indicates end of message | N/A |
| $$$ | Indicates end of remote control mode | N/A |

Figure 9:
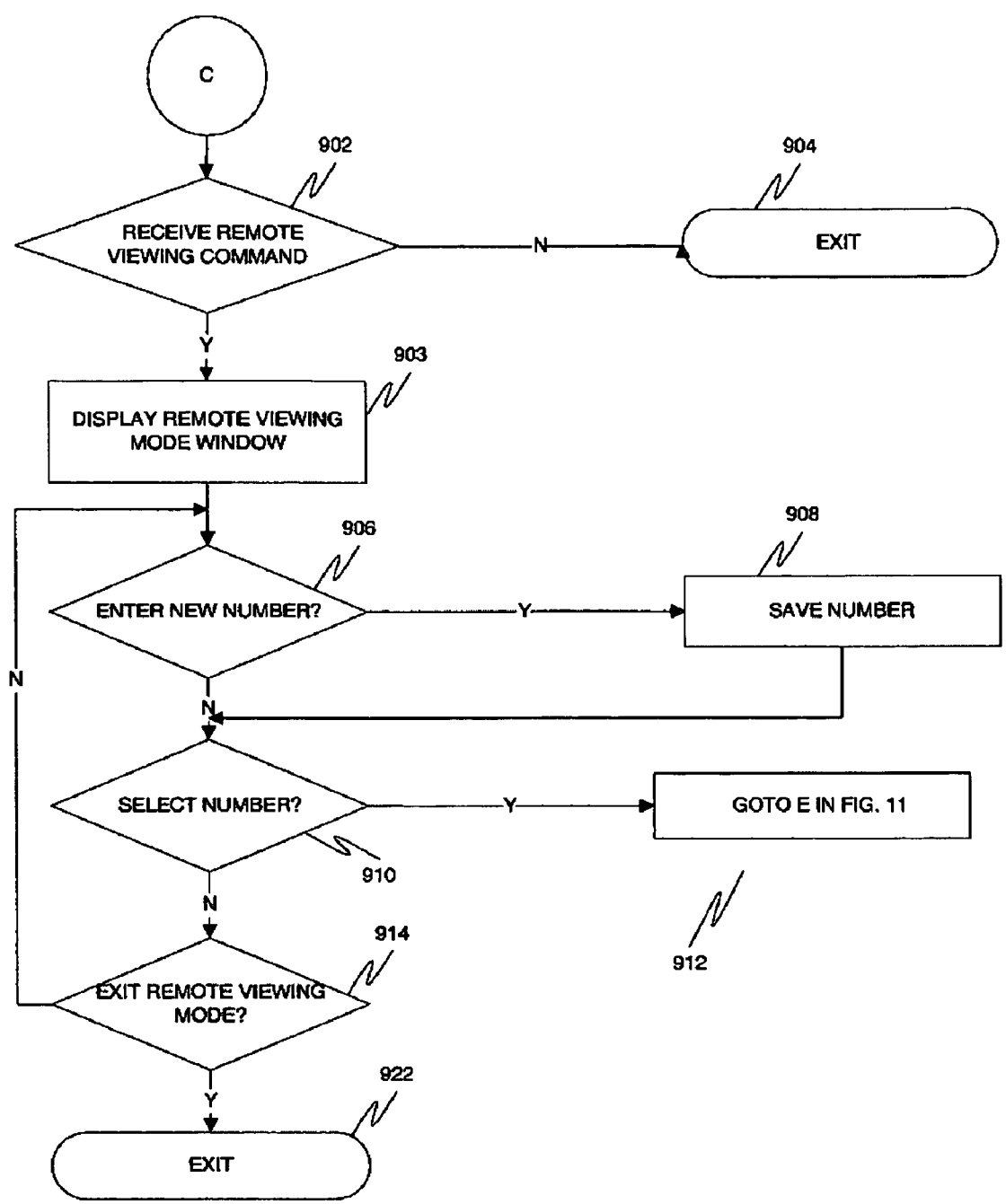
FIG. 9 is a flowchart illustrating the process to enter a remote viewing mode by a "viewing" device in accordance with an embodiment of the present invention.
Figure 10:
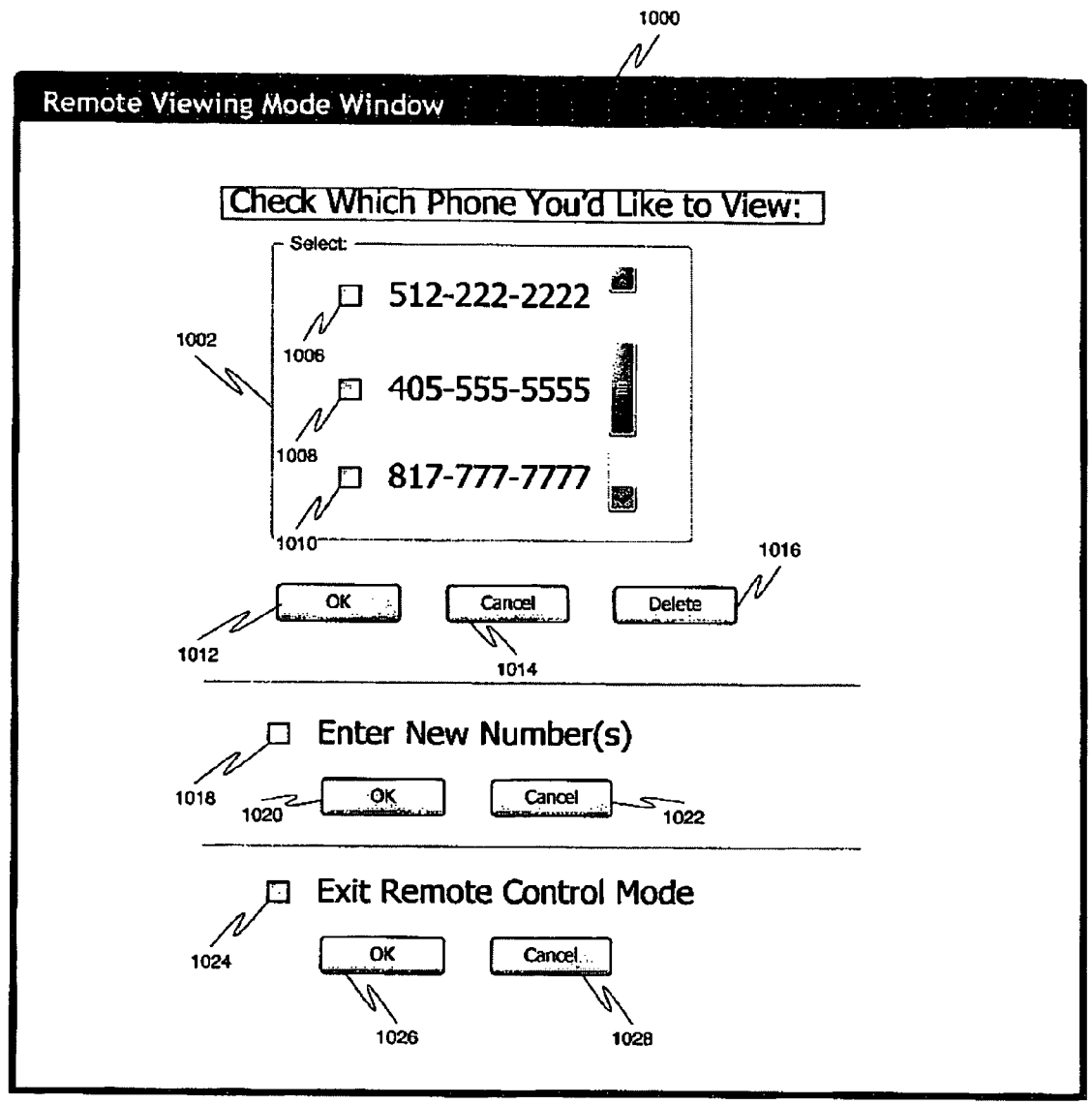
FIG. 10 is a pictorial representation of a remote viewing window displayed on a "viewing" device in accordance with an embodiment of the present invention

FIG. 9 is a flowchart illustrating the initial operation and steps performed by a "viewing" wireless device in a remote viewing mode in accordance with an embodiment of the present invention. Unlike the remote control mode, in one embodiment, the remote viewing mode allows each user of a viewed device and a viewing device, respectively, to locally operate their phone. However, when in the remote viewing mode, the user of the viewing device views or, alternatively, listens to the operations of the viewed device. In another embodiment, when in the remote viewing mode, the viewing device locks out all local operations, except the remote viewing command (described herein), while the user of the viewed device can locally operate the viewed device. At 902, the viewing device (e.g., wireless device 214) determines if it has received a remote viewing command from its user. This command may be invoked, for example, when the user presses the left function button 308 on the viewing device. Alternatively, any other suitable combination of user input buttons might be used to invoke the command. Moreover, in another embodiment, the remote viewing command may be sent to the viewing device by computer 222, or any device capable of communicating with MTSO 218. In any event, if the viewing device did not receive the remote viewing command, processing terminates at 904. If received, at 903, the viewing device displays a remote viewing window (see window 1000 in FIG. 10) on its display 306. Window 1000 allows the user to input and/or select one of a plurality of wireless devices, each identified by its telephone number in menu 1004, that he would like to view (e.g., wireless device 1006, 1008, or 1010).

At 906, the viewing device determines if its user would like to enter another telephone number. The user does so by checking box 1018 using scroll buttons (not shown) and left function button 308, and then selecting OK 1020. The user may also cancel his selection by selecting cancel 1022. One skilled in the art readily recognizes that user selections and input may be made using one or more of keypad buttons 316, function buttons 308, call and receive buttons 310, and scroll buttons (not shown). If so, the user enters the telephone number using keypad 316 into a displayed menu (not shown), wherein the viewing device saves the number in memory 354 and adds it to menu 1004 at 908. At 910, the viewing device determines if its user would like to select a displayed telephone number in menu 1004. To do so, the user selects box 1006, 1008, or 1010, for example. Then, the user may attempt to view the operation of the wireless device associated with the selected number by selecting OK button 1012, cancel his selection by selecting "cancel" 1014, or delete the number by selecting "delete" 1016. If the user selects a telephone number and OK button 1012, at 912, the viewing device attempts to place itself in a "remote viewing mode" and processing moves to E in FIG. 11 (described herein). Otherwise, at 914, the viewing device determines if its user would like to exit the remote viewing mode (or, alternatively, exit window 1000). The user does so by selecting box 1024 and OK 1026 and, if so, the process terminates at 922. Cancel button 1028 allows the user to back out of the exit operation.

Figure 11:
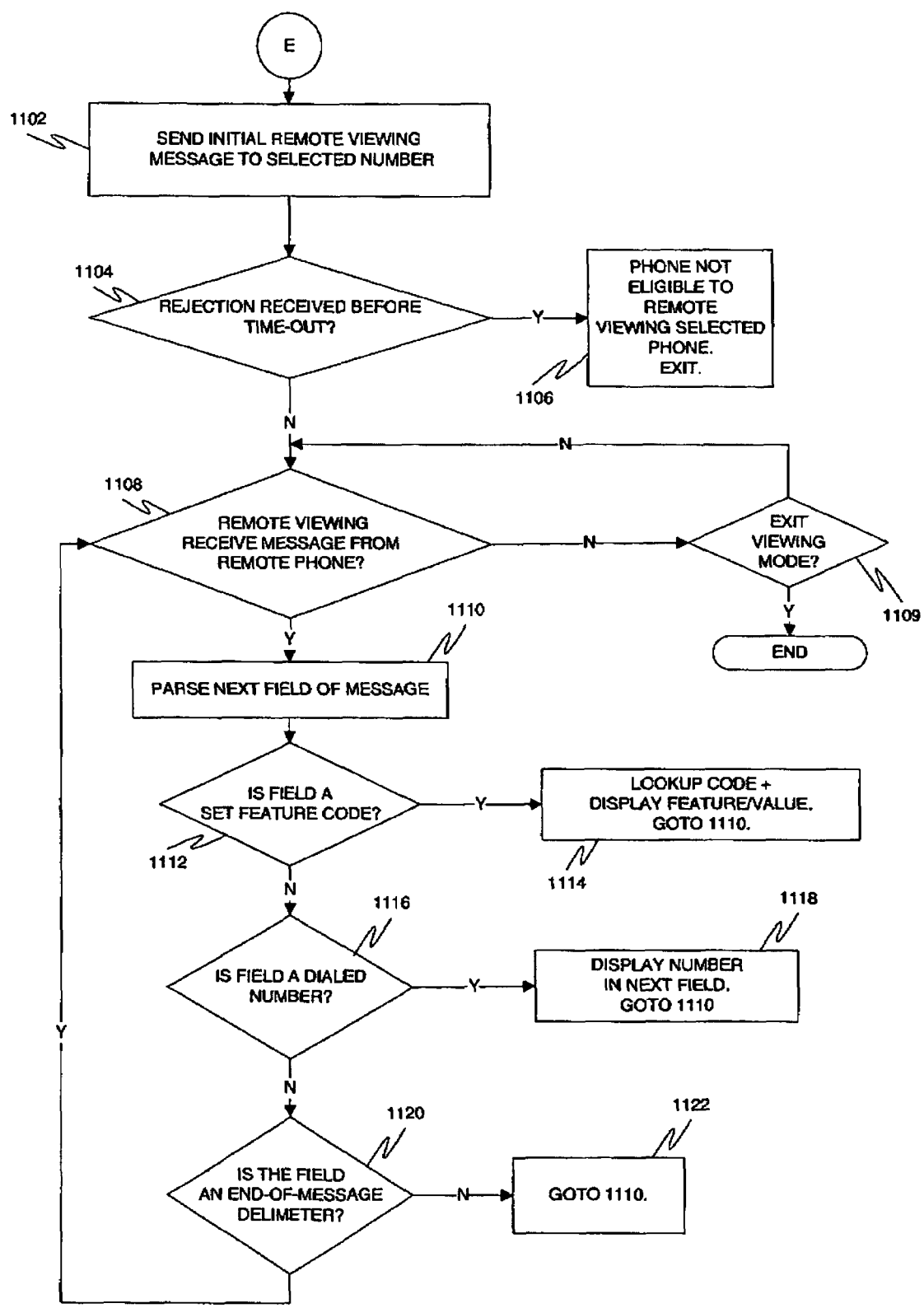
FIG. 11 is a flowchart illustrating the operation of a "viewing" device after it has received a remote viewing command from a user.

FIG. 11 is a flowchart illustrating the operation of a viewing device after it has received a remote viewing command from its user. Referring to FIGS. 3A and 11, processing begins at 1102, where processor 352 of the viewing device is programmed to construct an initial SMS remote viewing message to be transmitted on its reverse control path via antenna 320 to the selected wireless device (herein viewed device, which may be wireless device 212). One function of the initial SMS remote viewing message is to request authorization from the viewed device to remotely view (or, alternatively, listen to) its operation. The first characters of the initial SMS remote viewing request message are a predetermined start delimiter, defined as a series of characters that normally do not occur at the start of a message. For example, the start delimiter may be $$AB, but the number and sequence of characters are not limited and should be chosen to minimize false indications of remote viewing messages. A predetermined delimiter, such as a "$", denotes the end of the current field and the beginning of the next. The next data field identifies the model ID number of the intended viewing device, wherein the viewed device looks up that model ID number in a database list (not shown) of compatible hardware devices (i.e., handsets). If the viewed device does not find the model ID number, then the two devices are incompatible and the viewed device will send a rejection message to the viewing device. The next data field identifies the viewing device's telephone number, followed by the next field, which identifies a minimum software version required by the viewed device to perform the process. Finally, the next field includes a predetermined code that may be processed by the viewed device to perform certain features or functions (described in further detail herein). Accordingly, an illustrative initial remote viewing message may be:

$$AB$200A?4044441234$303$1000$$

where $$AB indicates an SMS remote viewing message, 200A indicates the model ID number of the viewing device, 4044441234 is the telephone number of the viewing device, 303 indicates the minimum software version, and 1000 indicates a function to be performed by the viewed device, such as activate the handset. $$ indicates the end of the message.

After the viewing device transmits the above initial SMS remote viewing message on its reverse control path, at 1104, it determines if it has received an SMS rejection message on its forward control path from the viewed device before a predetermined amount of time has elasped. The rejection message may contain a predetermined delimiter indicating that it is a rejection message, followed by the telephone number of the viewed device. For example, the rejection message may be $$56$5121234567$$, where $$56 indicates a rejection, $ is the separation delimiter between the data fields, 5121234567 is the telephone number of the viewed device, and the final $$ indicates the end of the message. Optionally, the viewing device may determine if it has received an SMS confirmation message from the viewed device, which may contain a predetermined delimiter indicating that it is a confirmation message (e.g., $$99), followed by the viewed device's telephone number. If the viewing device receives a rejection message, at 1106, it terminates remote viewing processing because it does not have authorization from the viewed device to remotely view. This may be because, for example, the handsets are incompatible, the viewed device does not have software to support remote viewing, or the viewing device is simply not authorized to perform such operations. If the viewing device does not receive a rejection message (or optionally receives a confirmation message from the viewed device), it enters a remote viewing mode (along with the viewed device), whereby the viewing device will display (or play) the operations entered on the viewed device. Accordingly, at 1108, for purposes of remote viewing, the viewing device determines if an SMS remote viewing message has been received from the viewed device (it determines if a message is a SMS remote viewing message by examining the first and second fields, which will be the start delimiter ($$AB) and viewed device's telephone number, respectively). If not, the user of the viewing device may exit the remote viewing mode at 1109 by inputting the remote viewing command. If so, at 1110, the viewing device parses the next field of the message. At 1112, the viewing device determines if the next field is a set feature code, which is used to change, select, or view standard mobile telephone features like one touch dialing, telephone book entries, and call log. As an example, when the user of the viewed device selects the "menu" button on his phone (e.g., left function button 308), the viewed device transmits on its reverse control path an SMS remote viewing message including code 100 to the viewing device (see Table 2 below). In response, at 1114, the viewing device looks up the code in a database located in memory 354 (see database shown in Table 2) to determine the corresponding function or operation (e.g., Menu) and displays (or alternatively audibly plays on its speaker 370) that function or operation on its display 306. In an embodiment, if the viewing device is currently busy handling a local operation when it receives the SMS remote viewing message, it terminates that local operation (not shown) and displays the remote operation. Control returns to 1110, where the viewing device parses the next field of the SMS remote viewing message.

In another example, if the user of the viewed device selects "Messages" on his phone (e.g., left function button 308), the viewed device transmits an SMS remote viewing message that includes code 110 to the viewing device (e.g., $$AB$5121234567$110$$, where 5121234567 is the telephone number of the viewed device). In response, the viewing device looks up code 110 in Table 2, determines that the corresponding function is "Messages", and displays (or alternatively plays via audio processor 368 and speaker 370) "Messages" on its display 366. If the user of the viewed device selects "Add Entry", it transmits an SMS remote viewing message containing code 120 in one field, followed by the value (e.g., name) of the entry in the next field, to the viewing device (e.g., $$AB$5121234567$120$JaneDoe$$). In response, the viewing device recognizes code 120 as an "Add Entry" function by examining Table 2, displays it, and then displays (or plays) the value found in the next field (e.g., Jane Doe). Using this process, the viewing device displays or plays the operation of the viewed device.

TABLE 2

REMOTE VIEWING MODE

| Code | Function | Next Field |
|---|---|---|
| 100 | "Menu" Function; Display "Menu" | N/A |
| 110 | "Messages" Function; Display "Messages" | N/A |
| 120 | "Add Entry" Function; Display "Add Entry"; Display value in next field | Jane Doe |
| 130 | "Dial Number" Function; Display value in next field | 5124441234 |
| 1000 | Turn on mobile phone; set "on" bit to 1 | N/A |
| $$AB | Indicates Remote Viewing Message | N/A |
| $$56 | Indicates a Rejection Message | N/A |
| $$99 | Indicates a Confirmation Message | N/A |
| $$ | Indicates end of message | N/A |
| $$$ | Indicates end of remote viewing mode | N/A |

If the next field was not a set feature code, at 1116, the viewing device determines if the next field is a dialed number. For example, if the user of the viewed device enters a number and selects call button 310, in addition to dialing the number, the viewed device transmits an SMS remote viewing message containing code 130 in one field, followed by the dialed number in the next field, to the viewing device (e.g., $$AB$5121234567$130$5124441234$$). In response, the viewing device determines that code 130 is a "dial number" function by examining Table 2 and, at 1118, displays (or plays) the number in the next field (e.g., 5124441234). Again, if the viewing device is busy with a local operation when it receives the SMS remote viewing message, it terminates that local operation and displays the remote feature. Control returns to 1110, where the viewing device parses the next field. On the other hand, returning to 1116, if the next field was not a dialed number, at 1120, the viewing device determines if the next field is an end-of-message delimiter (e.g., $$) and, if so, control returns to 1108, where the viewing device waits for another SMS remote viewing message. If the next field is not an end-of message delimiter, control returns to 1110, where the viewing device parses the next field of the message.

Figure 12:
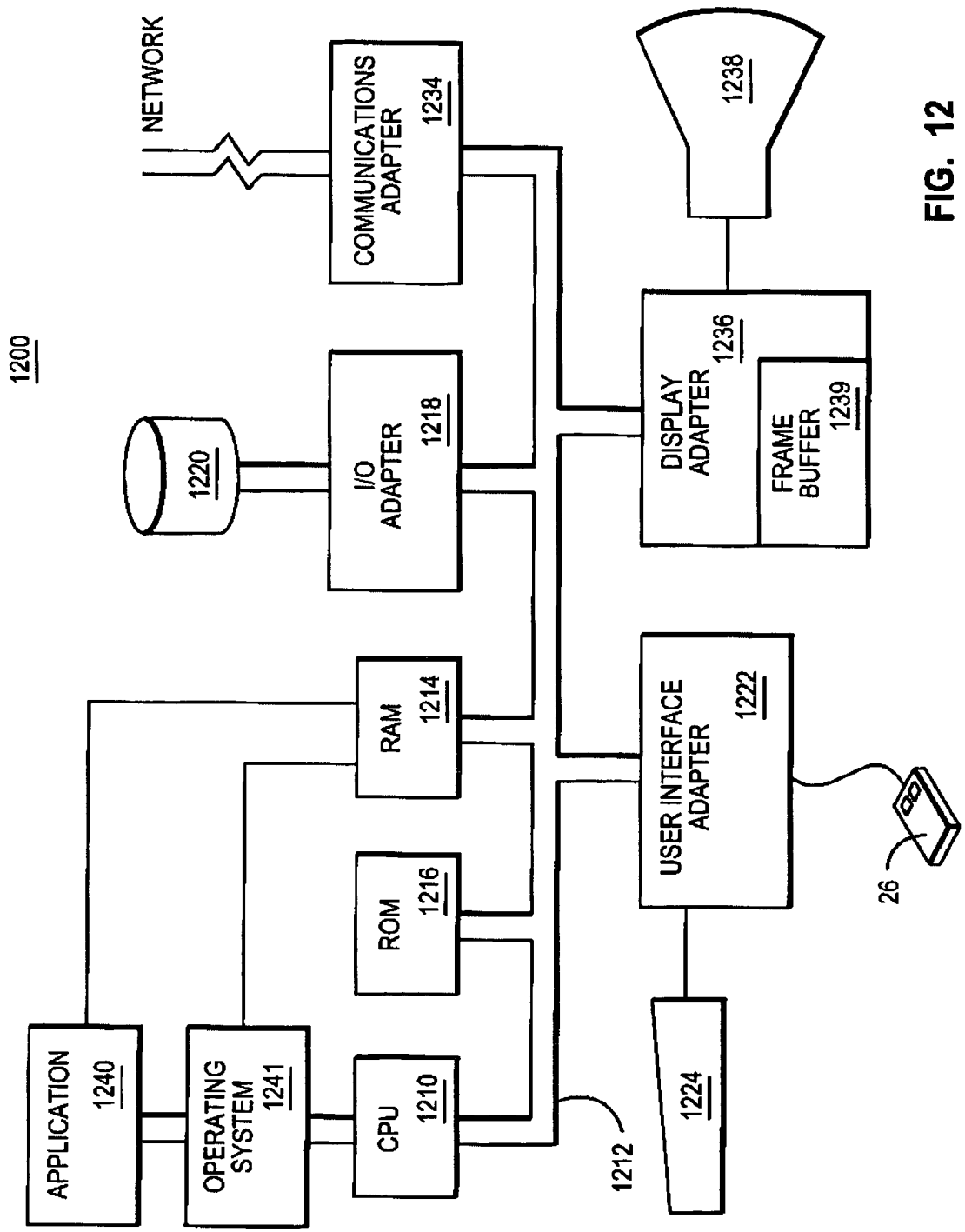
FIG. 12 is a block diagram depicting a computer system in which an aspect of the present method and system may be implemented.

FIG. 12 is a block diagram depicting a computer system 1200 for use in an embodiment of the present invention. A central processing unit (CPU) 1210 connects to various other components by system bus 1212. An operating system 1241 runs on CPU 1210, provides control, and coordinates the functions of the various components. Operating system 1241 may be one of the commercially available operating systems, such as Microsoft Windows Mobile or Palm OS, as well as UNIX, AIX, or LINUX operating systems, and typically resides within RAM 1214 and disk storage device 1220. Application programs 1240, controlled by the system, are moved into and out of the main memory, RAM 1214, from disk storage device 1220. These programs include steps for transmitting commands and operations to and from wireless devices 214 and 212 such that one may be capable of operating or viewing the other as described above.

ROM 1216 connects to CPU 1210 via bus 1212 and includes the basic input/output system (BIOS) that controls the basic computer functions. RAM 1214, I/O adapter 1218, and communications adapter 1234 are also interconnected to system bus 1212. I/O adapter 1218 communicates with the disk storage device 1220, which may be used to store database information (e.g., database storage). Communications adapter 1234 interconnects bus 1212 with an outside network enabling the data processing system to communicate as respectively described above through the Web, Internet, Telco wireless network, or intranet. I/O devices also connect to system bus 1212 via user interface adapter 1222 and display adapter 1236. Keyboard 1224 and mouse 1226 connect to bus 1212 through user interface adapter 1222. It is through such input devices that the vendor may interactively receive or control E-Mail messages or other information. Display adapter 1236 includes a frame buffer 1239, which is a storage device that holds a representation of each pixel on display 1238. Images may be stored in frame buffer 1239 for display on monitor 1238 through various components, such as a digital to analog converter (not shown) and the like. By using the aforementioned I/O devices, the user is capable of inputting information to the system through keyboard 1224 or mouse 1226 and receiving output information from the system via display 1238.

While the invention has been particularly shown and described with reference to various embodiments, it will be understood by those skilled in the art that various changes in form and detail may be made herein without departing from the spirit and scope of the invention.

We claim:

1. In a telecommunications network having at least one base station, central office for directing telephone traffic, and a plurality of wireless telephone devices, a system for remotely operating a first wireless telephone device by a second wireless telephone device, comprising:

a first processors; and
a first memory coupled to the first processor, wherein the memory comprises first instructions which, when executed by the first processor, causes the first processor to:
lock out, in response to the first wireless telephone device entering a remote control mode as a result of receiving a remote control message from the network, all local operations entered on a keypad or buttons of the second wireless telephone device, in which the processor and memory are provided, except for an end of remote control command used to exit the remote control mode; and
transmit all local operations, except for the end of remote control command, entered on the keypad or buttons of the second wireless telephone device to the first wireless telephone device, via the network, for remote operation of the first wireless telephone device, and wherein:
the first wireless telephone device locks out all local operations entered on a keypad or buttons of the first wireless device, such that the first wireless telephone device is solely operated by the second wireless telephone device;
the first and second wireless telephone devices operate in the remote control mode until the end of remote control command is entered on the second wireless telephone device; and in response to the remote control command being entered on the second wireless telephone device, each of the first and second wireless telephone devices exit the remote control mode and resume local operation.

2. The system of claim 1, wherein the remote control message requests authorization for the second wireless telephone device to operate the first wireless telephone device and the first wireless telephone device enters a remote control mode in response to the first wireless telephone device authorizing the second wireless telephone device to operate the first wireless telephone device.

3. The system of claim 1, wherein the first wireless telephone device receives the remote control message from one of the second wireless telephone device or a computer, and wherein the first wireless telephone device exits the remote control mode in response to receiving a second remote control message from the second wireless telephone device or the computer.

4. The system of claim 1, wherein the remote control message comprises a SMS message having a delimiter to indicate a beginning of the remote control message and one or more of a hardware identification and software version of the second wireless telephone device.

5. The system of claim 1, wherein the remote control message comprises a turn-on code, wherein the first wireless telephone device turns on in response to processing the turn-on code.

6. The system of claim 2, wherein the first wireless telephone device determines whether the second wireless telephone device is authorized by looking up an identification of the second wireless telephone device contained in the remote control message with an authorization list.

7. The system of claim 4, further comprising:
a second processor; and
a second memory coupled to the second processor, the second processor and second memory being provided in the first wireless device, wherein the second memory comprises second instructions which, when executed by the second processor, causes the second processor to:
compare at least one of the hardware identification or software version of the second wireless telephone device with a hardware identification or software version of the first device; and
in response to a match, the first wireless telephone device determines that the first wireless telephone device and second wireless telephone device are compatible.

8. The system of claim 7, wherein:
the second instructions further cause the second processor to transmit, in response to the first wireless telephone device receiving the remote control message and in response to the first wireless telephone device being busy, a busy command to the second wireless telephone device;
the first instructions further cause the first processor to:
determine, in response to receiving the busy command, whether the second wireless telephone device should override the first wireless telephone device;
override, in response to determining that the second wireless telephone device should override the first wireless telephone device, the busy command and enter the remote control mode; and
transmit in response to determining that the second wireless telephone device should not override the first wireless telephone device, a second remote control message to the first wireless telephone device over the network in response to an expiration of a timer, thereby delaying entry, by the first wireless telephone device and the second wireless telephone device, of the remote control mode.

9. The system of claim 7, wherein the second instructions further cause the second processor to:
receive a message having two or more fields from the second wireless telephone device;
determine whether the message includes a set feature code in a first field;
set, in response to receiving the set feature code, a function associated with the set feature code to a value in the next field or performing the function;
determine whether the message includes a telephone number to be dialed; and
dial, in response to the message including a telephone number to be dialed, the telephone number.

10. In a telecommunications network having at least one base station, central office for directing telephone traffic, and a plurality of wireless telephone devices, a system for remotely viewing operations entered on a first wireless telephone device by a second wireless telephone device, comprising:
the first wireless telephone device having a first processor and a first memory coupled to the first processor, the first memory comprising first instructions for execution by the first processor; and
the second wireless telephone device having a second processor and a second memory coupled to the second processor, the second memory comprising second instructions for execution by the second processor, wherein the first instructions and second instructions are configured such that when executed by their respective first processor and second processor, cause the first wireless telephone device and second wireless telephone device to:
receive, by the first wireless telephone device, a remote viewing message, wherein the remote viewing message requests authorization for the second wireless telephone device to remotely view operations of the first wireless telephone device; and
enter, by the first and second wireless telephone devices, in response to the first wireless telephone device authorizing the second wireless telephone device, a remote viewing mode, wherein the first wireless telephone device locally operates a first local operation entered on the first wireless telephone device and simultaneously transmits a second remote viewing message corresponding to the first local operation to the second wireless telephone device for audible or visual display, but not operation, of the first local operation by the second wireless telephone device, and wherein:
the second wireless device locks out all local operations entered on a keypad or buttons of the second wireless telephone device, except for a remote viewing command used to exit the remote viewing mode, such that the second wireless telephone device remotely observes all operations entered on the first wireless telephone device;
the first and second wireless telephone devices operate in the remote viewing mode until the remote viewing command is entered on the second wireless telephone device; and
in response to receiving the remote viewing command by the second wireless telephone device, each of the first and second wireless telephone devices exits the remote viewing mode and the second wireless telephone device resumes local operation.

* * * * *